(12) United States Patent
Gibbon et al.

(10) Patent No.: US 9,883,222 B2
(45) Date of Patent: Jan. 30, 2018

(54) METHOD AND APPARATUS FOR PROVIDING MEDIA CONTENT

(71) Applicant: AT&T INTELLECTUAL PROPERTY I, L.P., Atlanta, GA (US)

(72) Inventors: David Crawford Gibbon, Lincroft, NJ (US); Lee Begeja, Gillette, NJ (US); Zhu Liu, Marlboro, NJ (US); Amy Ruth Reibman, Chatham, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/339,336

(22) Filed: Oct. 31, 2016

(65) Prior Publication Data
US 2017/0048570 A1 Feb. 16, 2017

Related U.S. Application Data

(63) Continuation of application No. 14/089,903, filed on Nov. 26, 2013, now Pat. No. 9,516,358.

(51) Int. Cl.
*H04N 21/2662* (2011.01)
*H04N 21/2385* (2011.01)
(Continued)

(52) U.S. Cl.
CPC ..... *H04N 21/2662* (2013.01); *H04N 21/2385* (2013.01); *H04N 21/234363* (2013.01); *H04N 21/234381* (2013.01); *H04N 21/637* (2013.01)

(58) Field of Classification Search
CPC ....... H04N 21/2385; H04N 21/234363; H04N 21/234381; H04N 21/2662; H04N 21/637;
(Continued)

(56) References Cited

U.S. PATENT DOCUMENTS 4,924,308 A 5/1990 Feuchtwanger
4,979,041 A 12/1990 Schreiber
(Continued)

FOREIGN PATENT DOCUMENTS

EP 0964583 12/1999
WO 2012015460 A1 2/2012

OTHER PUBLICATIONS

"International Preliminary Report on Patentability", PCT/US14/063386, Jun. 9, 2016.
(Continued)

*Primary Examiner* — Nathan Flynn
*Assistant Examiner* — Alfonso Castro
(74) *Attorney, Agent, or Firm* — Guntin & Gust, PLC; Atanu Das (57) ABSTRACT

A method that incorporates teachings of the subject disclosure may include, for example, receiving, by a system comprising a processor, first media content from a service provider network over a high resolution channel at a first resolution, determining whether a first resolution exceeds a resolution threshold for viewing the first media content, transmitting a notification to the service provider network that the first resolution exceeds the resolution threshold, receiving the first media content from the service provider network over the high resolution channel at a second resolution according to the notification, wherein a difference between the first resolution and the second resolution provides unused bandwidth on the high resolution channel, and
(Continued)

receiving second media content from the service provider network over the unused bandwidth of the high resolution channel. Other embodiments are disclosed.

20 Claims, 7 Drawing Sheets

(51) Int. Cl.
*H04N 21/2343* (2011.01)
*H04N 21/637* (2011.01)

(58) Field of Classification Search
CPC ......... H04N 21/4621; H04N 21/25825; H04N 21/4316; H04N 21/478
USPC ....................................................... 725/126
See application file for complete search history.

(56) References Cited

U.S. PATENT DOCUMENTS

| | | | |
|---|---|---|---|
| 6,718,552 | B1 | 4/2004 | Goode |
| 7,039,048 | B1 | 5/2006 | Monta et al. |
| 7,395,544 | B2 | 7/2008 | Goldman et al. |
| 7,784,076 | B2 | 8/2010 | Demircin et al. |
| 7,793,328 | B2 | 9/2010 | Campbell |
| 7,797,723 | B2 | 9/2010 | Demircin et al. |
| 7,913,287 | B1* | 3/2011 | Franken ............. H04N 7/17327 725/141 |
| 8,161,388 | B2 | 4/2012 | Rodriguez et al. |
| 8,335,433 | B2 | 12/2012 | Heywood et al. |
| 2005/0071882 | A1 | 3/2005 | Rodriguez |
| 2007/0053293 | A1 | 3/2007 | McDonald et al. |
| 2007/0153916 | A1 | 7/2007 | Demircin et al. |
| 2008/0201748 | A1 | 8/2008 | Hasek et al. |
| 2008/0267589 | A1* | 10/2008 | Turner ........... H04N 21/234363 386/353 |
| 2008/0310446 | A1* | 12/2008 | Bellwood ............. H04N 7/163 370/468 |
| 2010/0250765 | A1* | 9/2010 | Riggert .......... H04N 21/234363 709/231 |
| 2011/0078724 | A1* | 3/2011 | Mehta ................... G06Q 30/02 725/32 |
| 2011/0249746 | A1 | 10/2011 | Yang et al. |
| 2012/0082208 | A1 | 4/2012 | Jiang et al. |
| 2012/0131627 | A1 | 5/2012 | Chittella |
| 2012/0307806 | A1 | 12/2012 | Agarwal et al. |
| 2013/0014136 | A1 | 1/2013 | Bhatia et al. |
| 2013/0163817 | A1 | 6/2013 | Porter et al. |
| 2013/0174209 | A1 | 7/2013 | Jung et al. |
| 2013/0202040 | A1 | 8/2013 | Ivanov et al. |
| 2014/0195675 | A1* | 7/2014 | Silver ................. H04L 65/1083 709/224 |

OTHER PUBLICATIONS

Harrop, Warren, "Quantifying the Broadband Access Bandwidth Demands of Typical Home Users", Australian Telecommunication Networks & Applications Conference (ATNAC), 2006.
Mukesh, Nathan et al., "CollaboraTV: Making Television Viewing Social Again", Oct. 22, 2008, 15.
Roh, Sunsik, "Design of Out-of-Band Protocols to Transmit UHDTV Contents in the CATV Network", Int. J. Communications, Network and System Sciences, 2012, 253-262.

* cited by examiner

METHOD AND APPARATUS FOR PROVIDING MEDIA CONTENT

CROSS REFERENCE TO RELATED APPLICATIONS

This application is a continuation of U.S. patent application Ser. No. 14/089,903 filed Nov. 26, 2013. The contents of the foregoing are hereby incorporated by reference into this application as if set forth herein in full.

FIELD OF THE DISCLOSURE

The subject disclosure relates to a method and apparatus for providing media content, and, more particularly providing multiple media content programming over a single ultra high definition television channel.

BACKGROUND

Media content is typically experienced by consumers via devices such as computers, televisions, radios, and mobile electronics. Media content is delivered by service providers, who send the content, such as television, radio, and video programming, to consumers for enjoyment at their physical locations. Modern communications networks benefit from interconnectivity between consumers and various communication devices. As network capabilities expand, these interconnections provide new opportunities to enhance the ability for consumers to enjoy media content by experiencing a variety of content over multiple devices.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for experiencing multiple media content programming over an ultra high definition television channel. Standard high resolution video programming, such as ultra high definition television (UDTV) can be made available to a media processor device that operates a display device. In some cases, capability limitations of the display device and/or how the display device is viewed can result in negligible perceived video quality difference between high resolution UDTV and lower resolution standards, such as high definition television (HDTV) presented at the display device.

Where the quality differences are not distinguishable, then a lower resolution version of media content can be substituted for the high resolution signal, which can result in freeing up bandwidth on the ultra high definition television channel. The additional available bandwidth can be used for secondary media content for the benefit of the viewer using the media processor device. The secondary media content can provide socialization opportunities that are related to the media content and that can be structured by the viewer and/or a social media network to which the viewer belongs.

One embodiment of the subject disclosure includes a device comprising a processor and a memory that stores executable instructions that, when executed by the processor, facilitate performance of operations, including transmitting first media content to a media processor device over a high resolution channel at a first resolution. The processor can perform operations including comparing the first resolution to a resolution capability of the media processor device. The processor can further perform operations including determining that the first resolution exceeds a resolution threshold according to the first resolution exceeding the resolution capability. The processor can perform operations including transmitting the first media content to the media processor device over the high resolution channel at a second resolution according to determining that the first resolution exceeds the resolution threshold. The second resolution is lower than the first resolution. The processor can perform operations including generating an excess bandwidth on the high resolution channel. A difference between the first resolution and the second resolution generates an excess in unused bandwidth on the high resolution channel. The processor can perform operations including transmitting second media content to the media processor device over the excess unused bandwidth of the high resolution channel at a third resolution. The second media content originates from a social media network.

One embodiment of the subject disclosure includes a machine-readable storage medium, comprising executable instructions. The executable instructions can cause a processor to perform operations including transmitting first media content to a media processor device over a high resolution channel at a first resolution. The executable instructions can also cause the processor to perform operations including determining whether the first resolution exceeds a resolution threshold for viewing the first media content via the media processor device. The executable instructions can further cause the processor to perform operations including transmitting the first media content to the media processor device over the high resolution channel at a second resolution responsive to determining that the first resolution exceeds the resolution threshold. A difference between the first resolution and the second resolution generates unused bandwidth in the high resolution channel. The executable instructions can cause the processor to perform operations including transmitting second media content to the media processor device over the unused bandwidth of the high resolution channel at a third resolution. The second media content originates from a social media network.

One embodiment of the subject disclosure includes a method including receiving, by a system comprising a processor, first media content from a service provider network over a high resolution channel at a first resolution. The method can include determining, by the system, whether a first resolution exceeds a resolution threshold for viewing the first media content. The method can further include transmitting, by the system, a notification to the service provider network that the first resolution exceeds the resolution threshold. The method can include receiving, by the system, the first media content from the service provider network over the high resolution channel at a second resolution according to the notification. A difference between the first resolution and the second resolution provides unused bandwidth on the high resolution channel. The method can also include receiving, by the system, second media content from the service provider network over the unused bandwidth of the high resolution channel.

Figure 1:
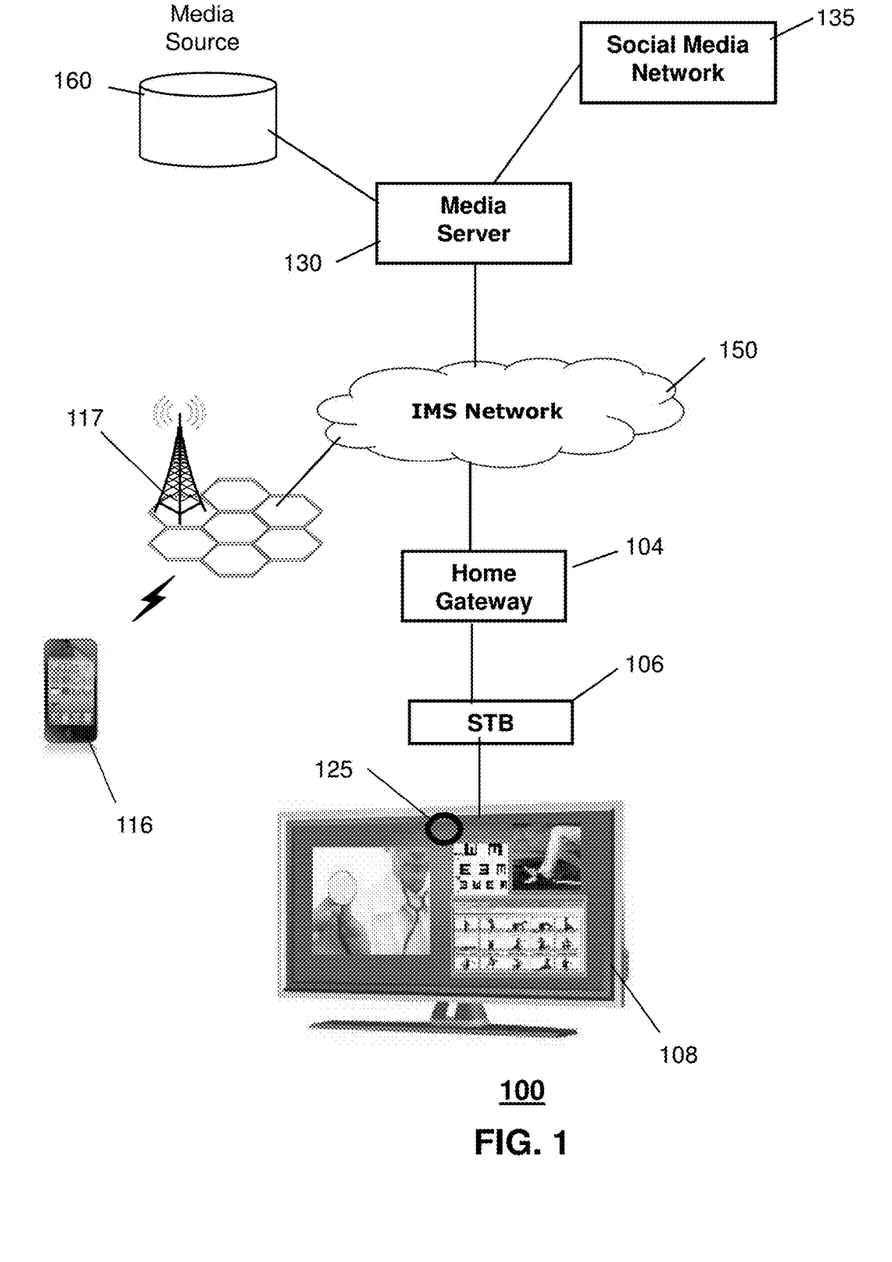
FIG. 1 depicts illustrative embodiments of a system that can be utilized for experiencing multiple media content programming over a single ultra high definition television channel.
Figure 2:
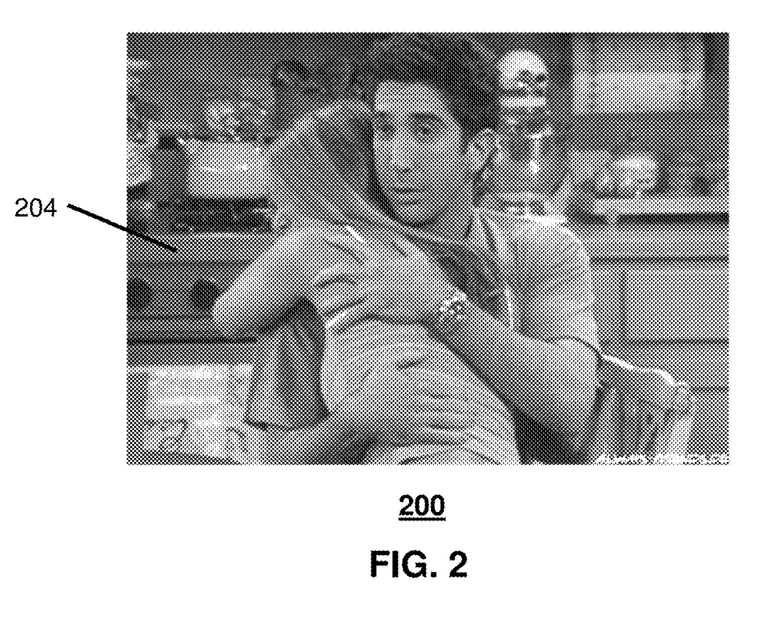
FIGS. 2-3 depict exemplary images illustrating, in part, media programming generated according to the systems of FIGS. 1, 5, and 6, and the method of FIG. 4.
Figure 3:
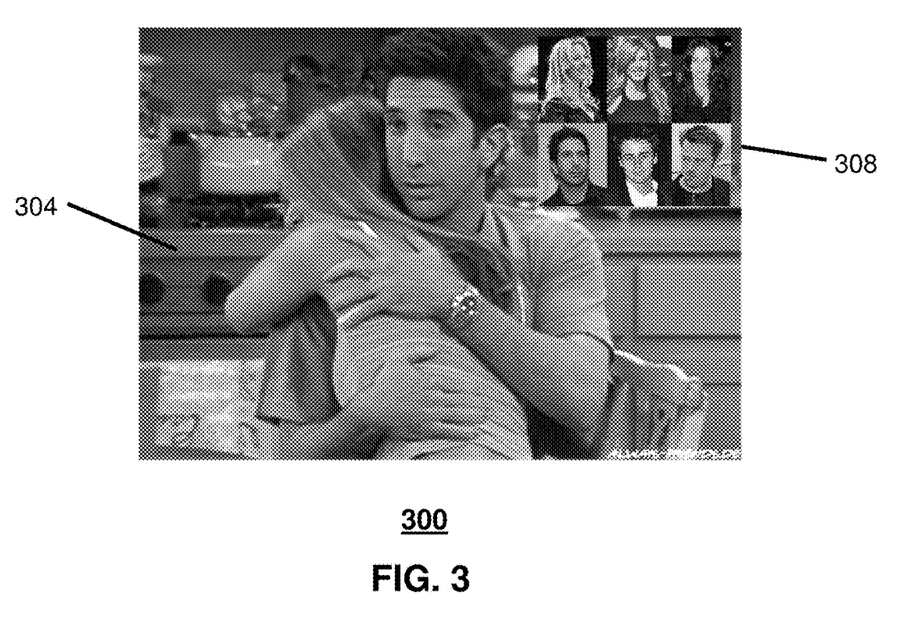

FIG. 1 depicts an illustrative embodiment of a system 100 that can be utilized for experiencing multiple media content programming over a single ultra high definition television channel. FIGS. 2-3 depict exemplary images illustrating, in part, experiencing multiple media content programming over a single ultra high definition television channel according to the system of FIG. 1.

In one or more embodiments, the system 100 can include a communication network 150. The system 100 can include a subscription telecommunication service, such as an Internet Protocol Multimedia Subsystem (IMS) network 150 for providing cellular/mobile communications, Internet access, and content to mobile communication devices 116 via a mobility network of mobile base stations 117. The system can include a subscription content service, such as an Internet Protocol Television (IPTV) network for providing media content to subscribers. The IPTV network can be part of a cable, satellite, or DSL based media content delivery system. The media content can be any type of viewable content, such as broadcast television, cable or premium television, video on demand, or pay-per-view television. The IPTV network can deliver media content to media processing devices 106 and media display devices 108 at subscriber locations via gateway devices 104.

In one or more embodiments, the system 100 can include one or more servers 130 that are associated with the IMS network 150. In one embodiment, a media server 130 can communicate with media processor devices 106 and mobile communication devices 116 over the IMS network 150. The media server 130 can receive media content from a media database 160. The media processor devices 106 can receive media content from the media server 130 over the IMS network 150. The mobile communication device 116 can communicate with the IMS network 150 using one or more components of a mobility network 117, such as cellular base stations for receiving and transmitting wireless communication signals.

In one or more embodiments, a media processor device 106 can communicate with a media server 130 via the IMS Network 150 by way of a gateway device 104. The media processor device 106 can receive user inputs from a remote control device for performing functions, such as powering ON/OFF, selecting channels for viewing media programs, adjusting volume, and/or programming a digital video recorder. The media processor device 106 can receive a user input for selecting a media program and/or a channel for receiving a media program. In one example, the media processor device 106 can present an electronic programming guide at a media device 108 for assisting in the selection of media programming.

In one or more embodiment, the media server 130 can receive media content from one or more media sources 160. The media content can represent broadcast programming, video-on-demand (VoD) programming, commercial content, and the like. The media content can be encoded using various encoding schemes and resolutions. In one embodiment, copies of media content can be made available to the media server 130 in various resolutions that are compatible with differing standards for standard television, high definition television, and/or ultra high definition television. The media server 130 can provide media content to many media processor devices 106 over the IMS network 150 via ultra high definition television channels and/or high definition television channels. The media content can be provided as broadcast television or VoD programming.

In one or more embodiments, the media server 130 can detect if an ultra high definition television signal from the media server 130 exceeds a resolution threshold for viewing the high resolution media content at the media processor device 106 and/or the media display device 108. For example, the media processor device 106 may be unable to decode a high resolution media content ultra high definition television signal. Alternatively, media processor device 106 can be able to decode the signal but unable to transmit the decoded signal to the media display device 108. As a result, the media display device 108 cannot take advantage of the higher resolution signal. In another example, the media display device 108 can be unable to process and/or display the high resolution signal. In another example, the media display device 108 can be too small or lack sufficient pixel count to properly display the high resolution signal.

In one or more embodiments, the media server 130 can determine that the ultra high definition television signal from the media server 130 exceeds the resolution threshold media processor device 106 and/or the media display device 108 by receiving a notification from the media processor device 106. For example, the media processor device 106 can send an error message or can attach error bits to a message to the media server 130. In one embodiment, the media processor device 106 and/or the media display device 108 can still function and can present the media content for viewing at the media display device 108. For example, the media processor device 106 and/or the media display device 108 can enter a default mode for handling the excessive resolution, wherein the media content is decoded and displayed using a lower resolution. As a result, a viewer of the media display device 108 could still watch the media content but would experience a lower resolution version that can be generated by compression and data loss at the media processor device 106 and/or the media display device 108. The media server 130 can be informed of this condition via an error message and/or notification.

In one or more embodiments, a viewing position for a viewer of the media display device 108 can exceed a distance threshold for advantageously viewing an ultra high definition television signal. Even when the media processor device 106 and the media display device 108 are capable of reproducing the high resolution signal, if the viewer is positioned a long distance from the media display device 108, the combination of screen size and distance can create a condition where the viewer cannot discern any real difference in quality of picture between the ultra high definition and high definition versions of the media content. That is, for the viewing position and screen size, it makes little or no difference, from a quality of image standpoint, if the ultra high definition signal is replaced with a high definition signal.

In one or more embodiments, the viewing position of the viewing person can be determined using a camera 125 or other image and/or presence capturing device at the media display device 108. For example, the camera 125 can capture images of the viewing area in front of the media display device 108. Viewing distance can be estimated using image analysis, including analysis of known reference points such as distance to a wall, distance to a piece of furniture, and/or size of a feature of a viewer. In another example, a low-cost depth sensor can be mounted at or near the display device 108. After the media display device 108 has determined from the image analysis or the depth sensor that the viewer is beyond a distance threshold for distinguishing ultra high definition television, then the media display device 108 can notify the media processor device 106, which, in turn, can notify the media server 130.

In one or more embodiments, the visual capabilities of the viewer can be used to determine if ultra high definition television can be distinguished by the user over high definition television. If a viewer is visually impaired, then she may not be able to distinguish ultra high definition television from high definition television. In one embodiment, a visual impairment can be self-reported by a viewer via the media processor device 106. In one embodiment, the visual impairment can be determined via a test or viewing aid administered by the media processor device and/or media display device 108. For example, the viewer could be shown several images having differing source resolutions and asked to provide preferences. Based on preference responses from the viewer, the media processor device 106 can determine if the viewer is visually impaired or limited in distinguishing ultra high definition content. If the viewer's impairment exceeds an impairment threshold, then the media processor device 106 can notify the media server 130 that the viewer is impaired for the sake of ultra high definition television. In one embodiment, the media processor device 106 can use a viewer identification technique to determine that the current viewer is one that has been identified as impaired. For example, each viewer can have a unique code or button on a remote control device for identification.

In one or more embodiments, if the media server 130 has determined that ultra high definition television is not needed in a situation, due to any of the above-described reasons (lack of capability of the media processor device 106 and/or the media display device 108, distance of the viewer, or visual impairment of the viewer). The media server 130 can transmit media content at a lower resolution over the ultra high definition television channel. For example, the media server 130 can first transmit a broadcast television program to the media processor device 106 at ultra high definition. After a notification that the media processor device 106 does not need the high resolution ultra high definition signal, the media server 130 can switch to a lower resolution signal, such as a signal meeting the high definition television specification. In one embodiment, the media server 130 can then transmit the media content at the lower resolution for the remainder of a media content program. In one embodiment, the media server 130 can send a notification to the media processor device 106 that the resolution has been lowered. The notification can be displayed to the viewer at the media display device 108 so that the viewer can be on notice regarding the changed resolution and the reasons for the change. This notification can prompt the viewer to check their media processor device 106 and/or media display device 108 to determine any reason for a lack of ultra high definition capability. The notification can also provide service provider contact information for further investigation of the situation. In one embodiment, the media server 130 can send a notification that requires the viewer to confirm the reduced resolution operation.

In one or more embodiments, the media server 130 can provide different resolutions of the media content 160. In one embodiment, the media server 130 can access a high resolution version of media content for use in ultra high definition television and then can access a lower resolution version of the same media content for use in high definition television. In one embodiment, the media server 130 can alter the resolution of the media content at the server 130 to provide different resolutions. For example, the media server 130 can decode the media content received from a media source 160 and then re-encode the media content to a new resolution before streaming it to the media processor device 106.

In one or more embodiments, changing the resolution of media content streamed on the ultra high definition television channel alters the available bandwidth of the channel for transmission of additional content and/or data. For example, switching from a high resolution version of media content that is compatible with the ultra high definition television specification to a version compatible with the high definition television specification can free up bandwidth on the ultra high definition television channel. This additional bandwidth can be left as additional bandwidth for purposes of making the transmission channel more robust and/or reducing system resource usage for supporting the channel. In one embodiment, however, the additional bandwidth can be used to provide additional content and/or data to the media processor device 106.

In one or more embodiments, the additional bandwidth made available by reducing the resolution for the media content can be used by the media server 130 to embed ultra-high frame rate media to the media processor device 106. In one embodiment, this second high frame content can be distilled to multiple inlaid frames at the same frame rate of the first stream. For example, if the first content has a frame rate of 30 frames per second (fps) and the second high frame content has a frame rate of 90 frames per second, three smaller resolution frames from the second content can be inlaid as part of the first content or as a single second content. Then the receiving processor 106 or the display 108 can correctly reassemble the second content at its higher frame rate. In another example the first content has a frame rate of 30 frames per second and the second content has a frame rate of 90 frames per second. In this embodiment, the second content is split into three smaller resolution contents (second, third, and fourth) by the media server 130 and then reassembled by the processor device 106 or the display 108. Both of these examples represent possible encoding schemes and not the entirety of possible techniques.

In one or more embodiments, the additional bandwidth made available by reducing the resolution for the media content can be used by the media server 130 to embed ultra-high frame rate media to the media processor device 106. In this embodiment, the content from the media source 160 is available at a high frame rate that can not be presented by either the media processor device 106 or the display device 108. Here, the media server 130 both reduces the resolution of the first content from the media source 160 and temporally sub-samples the first content at 90 frames per second to a frame rate that is presentable by the processor device 106 and the display 108 at 30 frames per second. In one example, three streams at a frame rate of 30 frames per second sub-sampled from the first content at 90 frames per second are presented as a single second content with three embedded frames. In another example, three streams at a frame rate of 30 frames per second sub-sampled from the first content at 90 frames per second are presented as a second, third, and fourth contents within the available bandwidth. In both examples, the first content is processed by the media server 130 and reassembled for presentation by either the media processor 106 or the display 108.

In one or more embodiments, the additional bandwidth made available by reducing the resolution for the media content can be used by the media server 130 to embed ultra-high frame rate media to the media processor device 106. In one example, a user viewing the display 108 may desire to view the first content from the media source 160 in "slow motion". Here, the media server 130 both reduces the resolution of the first content from the media source 160 and temporally sub-samples the first content at 90 frames per second to a frame rate that is presentable by the processor device 106 and the display 108 at 30 frames per second. With a user-generated signal provided to the display 108, mobile communication devices 116, or the media processor 106 directly, the media processor changes operation to reconstruct the first content at its original frame rate at 90 frames per second, but presented to the display 108 at the slower frame rate of 30 frames per second.

In one or more embodiments, the additional bandwidth made available by reducing the resolution of the media content can be used by the media server 130 to provide second media content to the media processor device 106. In one embodiment, the second content can be content that is provided from, or selected via, a social media network. In one embodiment, the second media content can be related to the first media content. For example, when the lower resolution media content is substituted into an ultra high definition television channel data stream, there will be available bandwidth within the data stream that is not used for transmission of the media content. This available bandwidth can be used to create a multi-screen and/or multi-function capability that enables live socialization between (or among) users or a group of users that are tuned to the channel. Each participant in the television channel can have the opportunity to enjoy both the reduced resolution version of the media content and an interactive social network experience that is targeted to the common interests of viewers of the media content.

In one embodiment, the high resolution media content 204 and the lower resolution media content 304 can appear to be the same or very nearly the same to the viewer. However, after freeing up bandwidth by changing to the lower resolution, the media processor 106 can present an offer to the viewer to present the second content "social group" information along with the media content. For example, where the media content is an episode of the television series, "Friends,' the second content can be an interactive "social network" site or window 308, featuring content that is selected and/or created by users of the social network. Group members can post comments, pictures, videos, participate in discussions, enter contests, and the like, within the social media context along with other group members.

In one embodiment, the media server 130 can create a channel or sub-channel within the ultra high definition television channel for communications between members of the group. The communications can facilitate a personal social experience for each member/participant. Part of this experience can include multiple means to create or stitch images together, focusing on what the socialized group wants rather than what broadcasters choose to show. For example, participants in the second content channel can enter data (comments, pictures, videos) using the media processor device 106, the media display device 108, and a remote control device (not shown). In one embodiment, members of the social network of the second content channel can access the site for other computing devices, including mobile communication devices 116. For example, a member of the social media network can log into a website via the Internet to access to interact with the social media network. The participants can enter data for the second channel from these devices.

In one embodiment, the personal channel or sub-channel can be visible only to "members" of the social network group, although others can request to join. For example, each member can be assigned authenticating information, such as a user name and password. Further, machine or network path identification associated with the media processor device 106 can be used for authenticating access to the second content channel. In one embodiment, the viewer can be authenticated automatically each time the media program is selected. If the media server 106 enables the second media content channel during the streaming of the media program, then the viewer is automatically given access to the sub-channel.

In one embodiment, dynamic selection of video resolution is provided and the additional bandwidth is automatically made available for the social function. The media processor device 106 can be configured to enable or disable this function. In one embodiment, the social function can be enabled for some users of the media processor device 106 and disabled for others. For example the second content channel can be enabled only for adults but not for children. In another embodiment, the dynamic resolution function can be enabled or disabled at the media processor device 106. For example, a user can decide that, regardless of the limitations of his equipment, he insists on receiving the full resolution UDTV signal. In another example, the user can decide to only allow the reduced resolution function for a particular channel or program.

In one or more embodiments, the dynamic resolution selection enables "member based" socialization adjacent to the video stream and can be part of multiple cloud offerings. The social network channel 308 can be displayed along with the media content 304 at the media display device 108. In one embodiment, real-time socialization permits sharing and/or development of a community of interest that is both social and personal. In one embodiment, exchanges between members of the second channel can be stored for future viewing by other members of the group, who perhaps could not participate in the original viewing.

In one or more embodiments, the second channel 308 can allow user-based control of on-screen images and pieces appearing to the viewer. For example, the second channel can permit 360 degree "panoramic" views, real-time video feedback, and socialization, and dynamic assembly of information.

Figure 4:
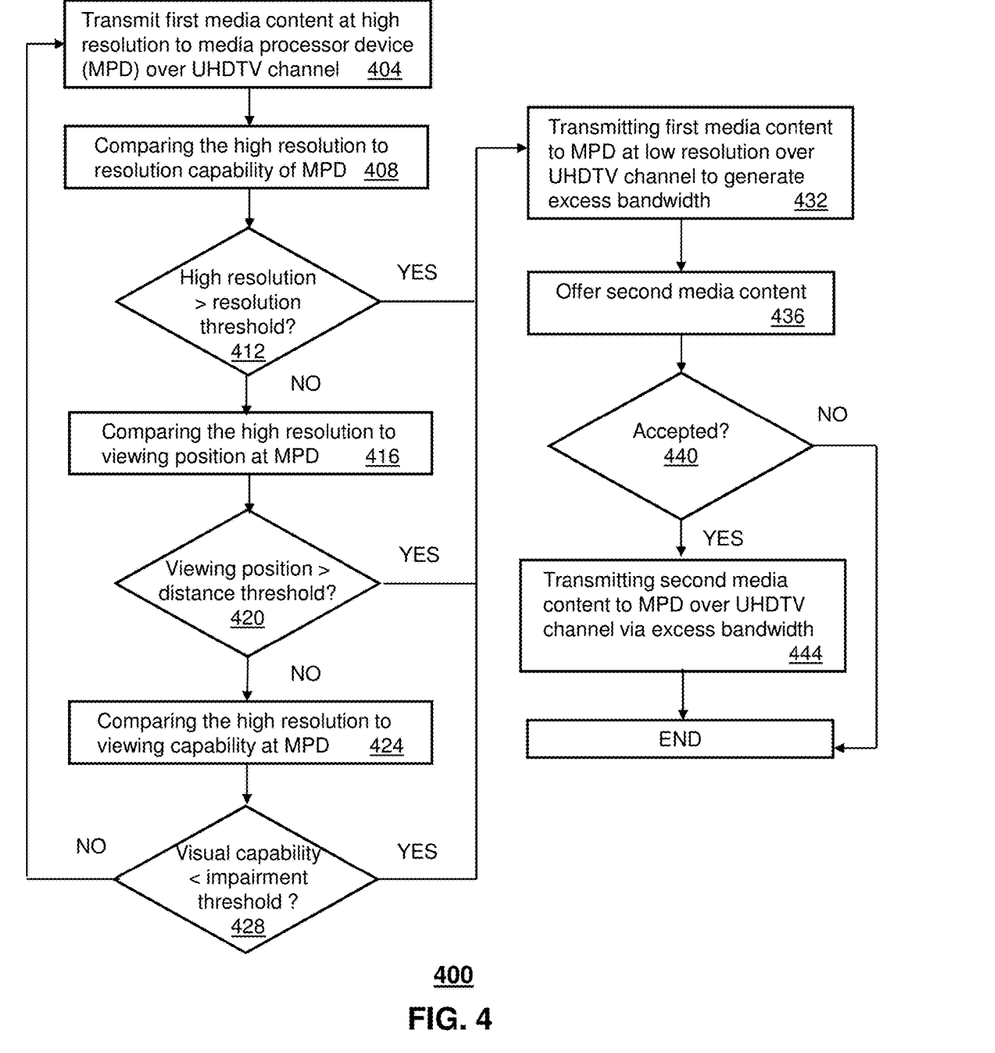
FIG. 4 depicts an illustrative embodiment of a method operating in portions of the system described in FIGS. 1, 5, and 6.
Figure 5:
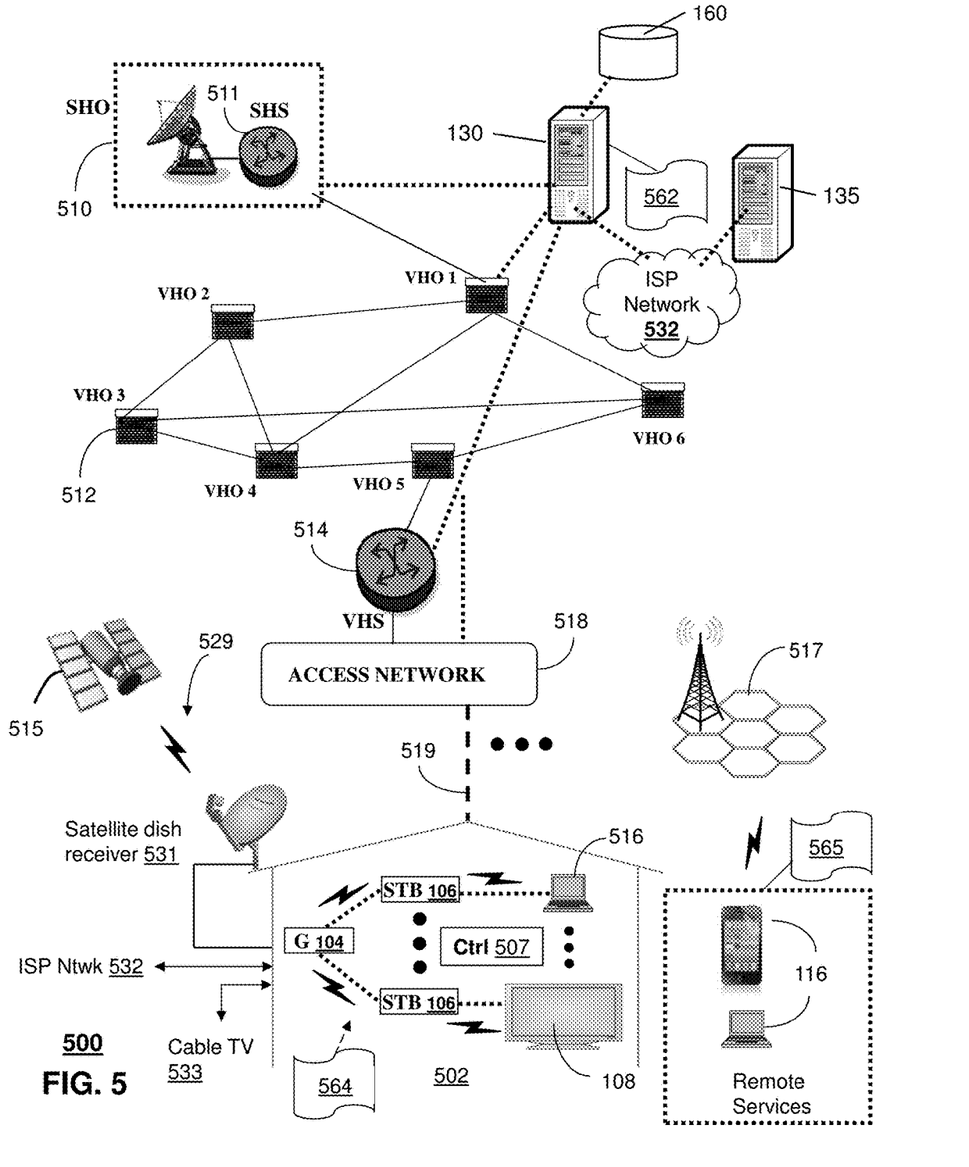
FIGS. 5 and 6 depict illustrative embodiments of communication systems for experiencing multiple media content programming over a single ultra high definition television channel according to embodiments illustrated in FIGS. 1, 5, and 6.
Figure 6:
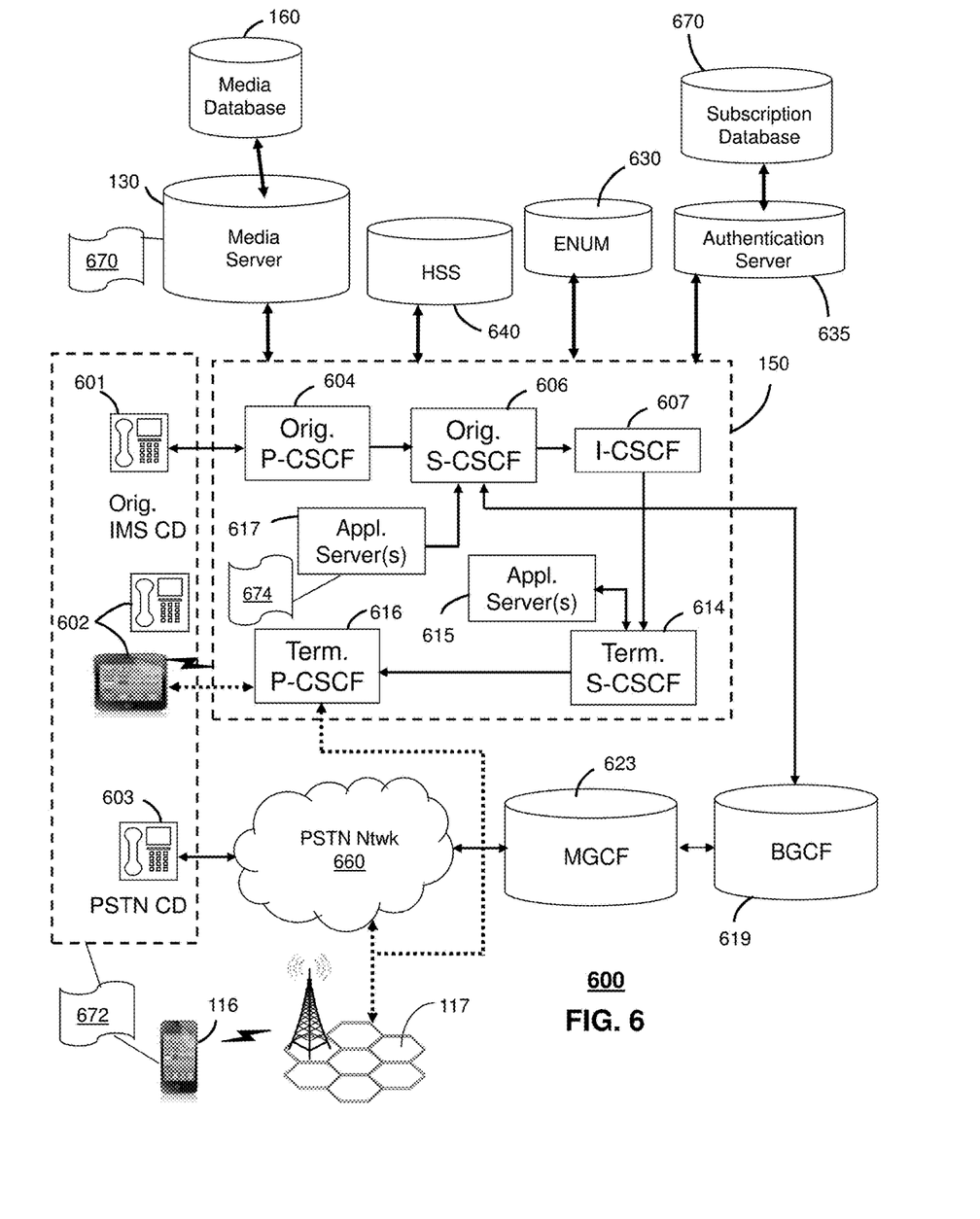

FIG. 4 depicts an illustrative embodiment of a method operating in or using portions of the system described in FIGS. 1, 5, and 6. Method 400 can begin with step 404, in which the media server 130 can transmit media content at high resolution to a media processor device 106 over an ultra high definition television channel.

In step 408, the media server 130 and/or the media processor device 106 can compare the high resolution to the resolution capability of the media processor device 106. In one embodiment, the media processor device 106 can send an error message or can attach error bits to a message to the media server 130. In one embodiment, the media processor device 106 and/or the media display device 108 can enter a default mode for handling the excess resolution, wherein the media content is decoded and displayed using a lower resolution. The media server 130 can be informed of this condition via an error message and/or notification. In step 412, if the high resolution does not exceed the resolution threshold of the media processor device 106, then, in step 416, the media server 130 and/or the media processor device 106 can compare the high resolution to a viewing position at the media processor device 106. Without loss of generality, step 408 may compare the frame rate of the content delivered to the media server 130 and/or the media processor device 106. Without loss of generality, step 412 determines that a frame rate threshold of the media processor device and the content can be temporally sub-sampled and additional second content may be added. If the threshold is not exceeded the resolution of the first is checked in step 416 as described above.

In one embodiment, the viewing position of the viewing person can be determined using a camera 125 or other image and/or presence capturing device at the media display device 108. Viewing distance can be estimated using image analysis, including analysis of known reference points such as distance to a wall, distance to a piece of furniture, and/or size of a feature of a viewer. In another example, a low-cost depth sensor can be mounted at or near the display device 108. In step 420, if the high resolution does not exceed the viewing distance threshold of the media processor device 106, then, in step 424, the media server 130 and/or the media processor device 106 can compare the high resolution to a viewing capability at the media processor device 106.

In one embodiment, the visual impairment can be determined via a test or viewing aid administered by the media processor device and/or media display device 108. For example, the viewer could be shown several images having differing source resolutions and asked to provide preferences. Based on preference responses from the viewer, the media processor device 106 can determine if the viewer is visually impaired or limited in distinguishing ultra high definition content. In step 428, if the high resolution does not exceed the impairment threshold of the media processor device 106, then, in step 432, the media server 130 can transmit the media content at a low resolution over the ultra high definition television channel while freeing up excess bandwidth. Also, if the high resolution exceeds the resolution threshold, in step 412, or the distance threshold, in step 428, then the media server 130 can transmit the media content at a low resolution over the ultra high definition television channel while freeing up excess bandwidth.

In step 436, the media server 130 can offer a second media content channel to the media processor device 106 using the excess bandwidth. If the viewer accepts the second content channel, in step 440, then the second media content is transmitted to the media processor device 106, in step 444. In one embodiment, the second content can be content that is provided from, or selected via, a social media network. In one embodiment, the second media content can be related to the first media content. The second media content can be a multi-screen and/or multi-function capability that enables live socialization between (or among) users or a group of users that are tuned to the channel. Each participant in the television channel can have the opportunity to enjoy both the reduced resolution version of the media content and an interactive social network experience that is targeted to the common interests of viewers of the media content.

FIG. 5 depicts an illustrative embodiment of a first communication system 500 for delivering media content. The communication system 500 can represent an Internet Protocol Television (IPTV) media system. Communication system 500 can be overlaid or operably coupled with the system of FIG. 1 that can be utilized for presenting, at a UHDTV channel of communication system 500, media content of multiple resolutions and for presenting a second channel.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 318 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth™, Zigbee™, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 400. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a media processor 130. The media processors 106 and wireless communication devices 116 can be provisioned with software functions 562 and 564, respectively, to utilize the services of media server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 6 depicts an illustrative embodiment of a communication system 600 employing IP Multimedia Subsystem (IMS) network architecture to facilitate the combined services of circuit-switched and packet-switched systems. Communication system 600 can be utilized for presenting, at a UHDTV channel of communication system 600, media content of multiple resolutions and for presenting a second channel.

Communication system 600 can comprise a Home Subscriber Server (HSS) 640, a tElephone NUmber Mapping (ENUM) server 630, and other network elements of an IMS network 150. The IMS network 150 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication systems 100 and 500 of FIGS. 1 and 5, respectively.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 117, a femtocell, a WiFi router, or another suitable wireless access unit to establish communications with the IMS network 150 of FIG. 6. The cellular access base station 117 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 117 may communicate directly with the IMS network 150 as shown by the arrow connecting the cellular base station 117 and the P-CSCF 616.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 130 of FIG. 6 can be operably coupled to the second communication system 600 for purposes similar to those described above. Media server 130 can perform function 670 and thereby provide media services to the CDs 601, 602, 603 and 605 of FIG. 6. CDs 601, 602, 603 and 605, which can be adapted with software to perform function 672 to utilize the services of the media server 130. Media server 130 can be an integral part of the application server(s) 617 performing function 674, which can be substantially similar to function 562 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
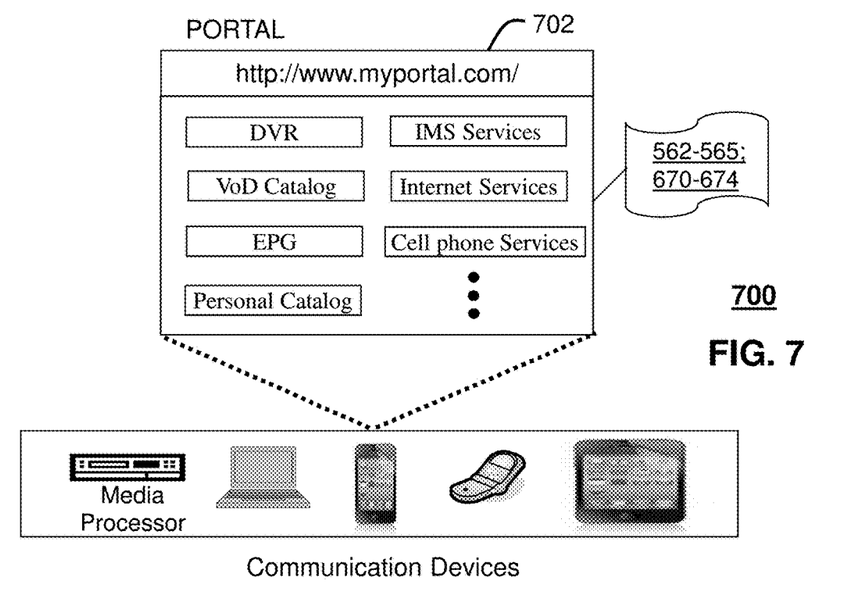
FIG. 7 depicts an illustrative embodiment of a web portal for configuring a media server and/or a media processor device for experiencing multiple media content programming over a single ultra high definition television channel according to the communication systems of FIGS. 1, 5, and 6.

FIG. 7 depicts an illustrative embodiment of a web portal 702 which can be hosted by server applications operating from the media server devices 130 of the communication system 100 illustrated in FIG. 1. Communication system 700 can be utilized for presenting, at a UHDTV channel of communication system 500, media content of multiple resolutions and for presenting a second channel. In one embodiment, the communication system 700 can perform as a portal for configuring operations of a media server 130 and/or a media processing device 106. In one embodiment, a media server 130 can receive a selection of a media program at a media processor device 106.

The web portal 702 can be used for managing services of communication systems 100, 500, and/or 600. A web page of the web portal 702 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1, 3, and 6. The web portal 702 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 702 can also be used for provisioning IMS services described earlier, provisioning Internet services, provisioning cellular phone services, and so on.

The web portal 702 can further be utilized to manage and provision software applications 562-565, and 670-674 to adapt these applications as may be desired by subscribers and service providers of communication systems 100, 600, and/or 700.

Figure 8:
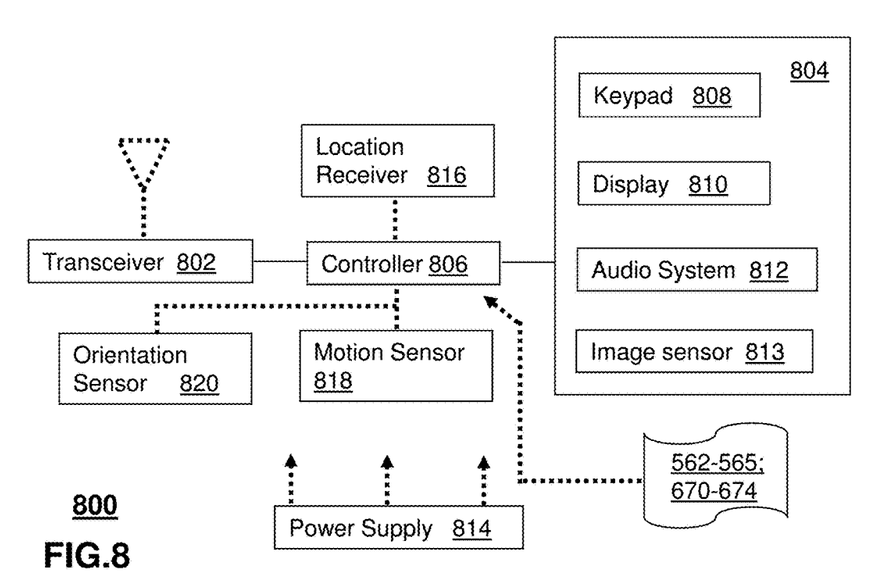
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 5, and 6. In one embodiment, the communication device 800 can be a mobile communication device 116A that communicates with a media server 130. In one embodiment, a media server 130 can receive a selection of a media program at a media processor device 106.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth™, ZigBee™, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the media processor 106, the media devices 108, or the portable communication devices 116A of FIG. 1, as well as the IMS CDs 601-602 and PSTN CDs 603-605 and mobile communication devices 116 of FIG. 6. It will be appreciated that the communication device 800 can also represent other devices that can operate in communication systems 500-600 of FIGS. 5-6 such as a gaming console and a media player.

The communication device 800 shown in FIG. 8 or portions thereof can serve as a representation of one or more of the devices of the communication system 100 of FIG. 1, the communication system 500 of FIG. 5, and the communication system 600 of FIG. 6. In addition, the controller 806 can be adapted in various embodiments to perform the functions 562-565 and 670-674, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
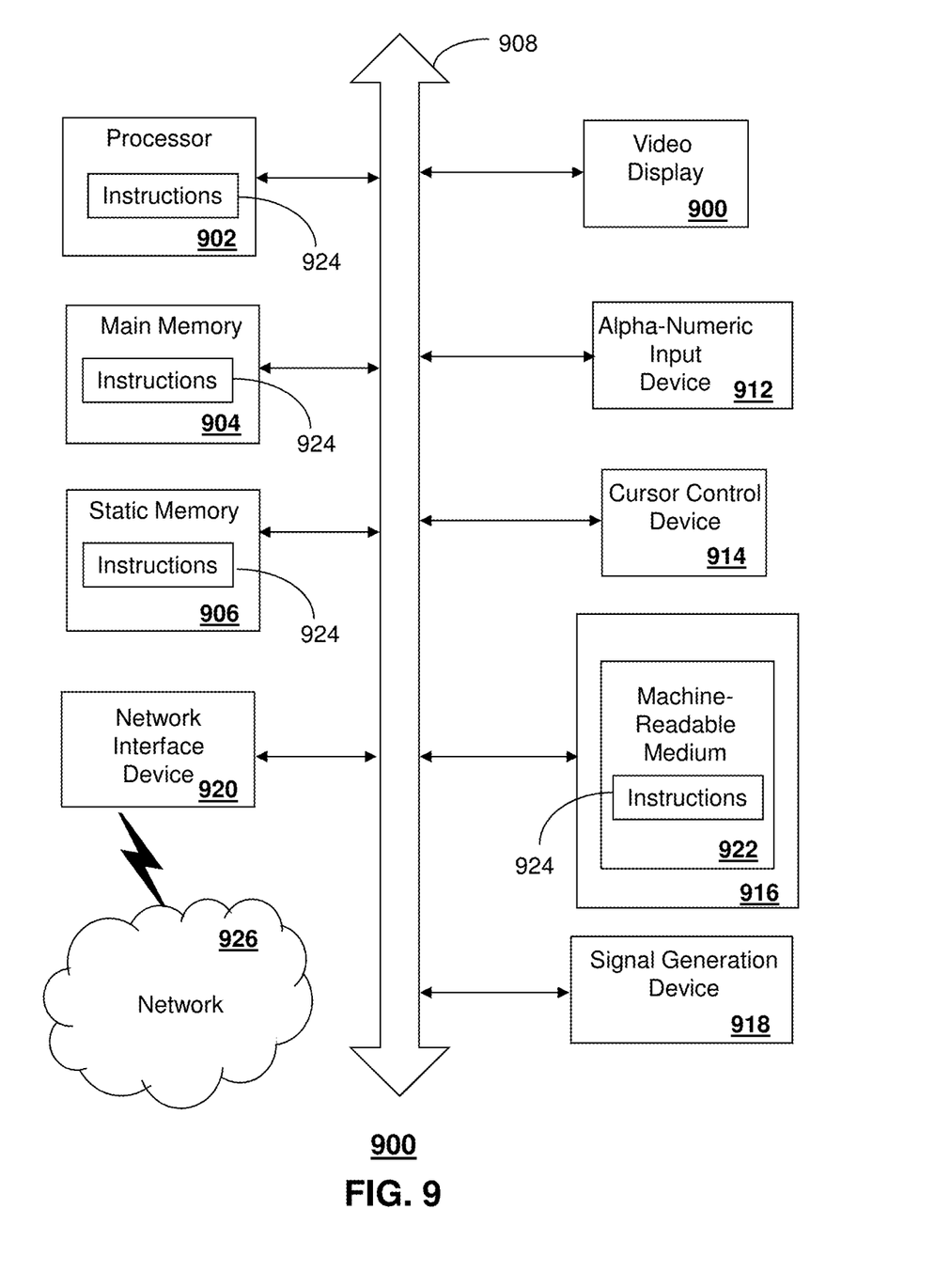
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the media server 130, mobile communication device 116A, gateway device 104A-D, and/or media processor 106 of FIGS. 1, 5, and 6. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving a plurality of captured images of a person while the person is contemporaneously viewing media content at a media device, wherein the plurality of captured images are captured by a camera communicatively coupled to the media device;

detecting a viewing position of the person from the media device by analyzing the captured images using image processing techniques;

determining a distance of the person from the media device according to the viewing position, wherein the distance is greater than a distance threshold for viewing the media content at a high resolution;

transmitting a first media content to the media device at a first resolution over a high resolution channel, the first resolution lower than the high resolution, generating excess unused bandwidth; and transmitting a second media content to the media device over the excess unused bandwidth in response to determining a user type of the person viewing the first media content, wherein the second media content is provided by a group of mobile communication devices, wherein the group of mobile communication devices is different from the media device from which the person is viewing the first media content, wherein the first media content comprises a previous recording of original media content, wherein the second media content comprises interactive social media content stored contemporaneously with a previous presentation of the original media content.

2. The device of claim 1, wherein the second media content is presented during a presentation of the first media content.

3. The device of claim 1, wherein the second media content is social media content that originates from a social media network.

4. The device of claim 1, wherein subject matter in the second media content is related to subject matter in the first media content.

5. The device of claim 1, wherein the media device presents the second media content in a window overlaying a part of the first media content presented by the media device.

6. A non-transitory machine-readable storage medium, comprising executable instructions that, when executed by a processing system including a processor, facilitate performance of operations, comprising:

receiving sensor information from a depth sensor, wherein the depth sensor is communicatively coupled to a media device;

detecting a viewing position of a person from the media device by analyzing the sensor information;

determining a distance of the person from the media device according to the viewing position, wherein the distance is greater than a distance threshold for viewing media content at a high resolution;

transmitting a first media content to the media device at a first resolution over a high resolution channel, the first resolution lower than the high resolution, generating excess unused bandwidth; and transmitting a second media content to the media device over the excess unused bandwidth in response to determining a user type of the person viewing the first media content, wherein the second media content is provided by a group of mobile communication devices, wherein the group of mobile communication devices is different from the media device from which the person is viewing the first media content, wherein the first media content comprises a previous recording of original media content, wherein the second media content comprises interactive social media content stored contemporaneously with a previous presentation of the original media content.

7. The non-transitory machine-readable storage medium of claim 6, wherein the second media content is presented during a presentation of the first media content.

8. The non-transitory machine-readable storage medium of claim 6, wherein the second media content is social media content that originates from a social media network.

9. The non-transitory machine-readable storage medium of claim 6, wherein subject matter in the second media content is related to subject matter in the first media content.

10. The non-transitory machine-readable storage medium of claim 6, wherein the media device presents the second media content in a window overlaying a part of the first media content presented by the media device.

11. A method, comprising:

detecting, by a processing system including a processor, a viewing position of a person from a media device;

determining, by the processing system, a distance of the person from the media device according to the viewing position, wherein the distance is greater than a distance threshold for viewing media content at a high resolution;

transmitting, by the processing system, a first media content to the media device at a first resolution over a high resolution channel, the first resolution lower than the high resolution, generating excess unused bandwidth; and transmitting, by the processing system, a second media content to the media device over the excess unused bandwidth in response to determining a user type of the person viewing the first media content, wherein the second media content is provided by a group of mobile communication devices, wherein the group of mobile communication devices is different from the media device from which the person is viewing the first media content, wherein the first media content comprises a previous recording of original media content, wherein the second media content comprises interactive social media content stored contemporaneously with a previous presentation of the original media content.

12. The method of claim 11, further comprising receiving, by the processing system, a plurality of captured images of the person, wherein the person is viewing media content at the media device, wherein the plurality of captured images are captured by a camera communicatively coupled to the media device, and wherein the detecting of the viewing position further comprises detecting, by the processing system, the viewing position of the person from the media device by analyzing the captured images using image processing techniques.

13. The method of claim 11, further comprising receiving, by the processing system, sensor information from a depth sensor, wherein the depth sensor is communicatively coupled to the media device, and wherein the detecting of the viewing position further comprises detecting, by the processing system the viewing position of the person from the media device by analyzing the sensor information.

14. The method of claim 11, wherein the second media content is presented during a presentation of the first media content.

15. The method of claim 11, wherein the second media content is social media content that originates from a social media network.

16. The method of claim 11, wherein subject matter in the second media content is related to subject matter in the first media content.

17. The method of claim 11, wherein the media device presents the second media content in a window overlaying a part of the first media content presented by media device.

18. The method of claim 11, further comprising:
- receiving, by the processing system, media selection information from user input occurring at the media device; and
- transmitting, by the processing system, the media selection information to a social media network, wherein the social media network updates the second media content according to the media selection information.

19. The method of claim 11, further comprising:
- transmitting, by the processing system, authentication information to a social media network; and
- receiving, by the processing system, the second media content from the social media network according to the authentication information.

20. The method of claim 11, further comprising receiving, by the processing system, creative content according to user-generated input, wherein the second media content includes the creative content.

\* \* \* \* \*